(12) United States Patent
Bendlin et al.

(10) Patent No.: US 9,310,599 B2
(45) Date of Patent: Apr. 12, 2016

(54) X-Y STAGE FOR MICROSCOPES HAVING A DIRECTION CHANGING COUPLING

(75) Inventors: Cornelia Bendlin, Goettingen (DE); Peter Schnuell, Gleichen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 601 days.

(21) Appl. No.: 13/808,248

(22) PCT Filed: Jun. 16, 2011

(86) PCT No.: PCT/EP2011/060029
§ 371 (c)(1),
(2), (4) Date: Mar. 22, 2013

(87) PCT Pub. No.: WO2012/004105
PCT Pub. Date: Jan. 12, 2012

(65) Prior Publication Data
US 2013/0208355 A1    Aug. 15, 2013

(30) Foreign Application Priority Data
Jul. 3, 2010 (DE) .......................... 10 2010 026 030

(51) Int. Cl.
*G02B 21/26* (2006.01)
(52) U.S. Cl.
CPC ..................................... *G02B 21/26* (2013.01)
(58) Field of Classification Search
CPC ......... G02B 21/00; G02B 21/24; G02B 21/26
USPC .................. 359/391, 392, 393, 394, 395, 368
See application file for complete search history.

(56) References Cited

U.S. PATENT DOCUMENTS

| 4,503,555 | A | * | 3/1985 | Brimhall et al. | ............. 382/109 |
| 4,557,568 | A | | 12/1985 | Van Benschoten | |
| 4,711,537 | A | | 12/1987 | Schindl et al. | |
| 4,772,109 | A | * | 9/1988 | Cutburth et al. | ............. 359/393 |
| 5,557,456 | A | | 9/1996 | Garner et al. | |
| 5,768,013 | A | | 6/1998 | Kraft | |
| 6,049,420 | A | | 4/2000 | Kraft | |
| 2003/0169492 | A1 | * | 9/2003 | Nishida et al. | ................ 359/393 |
| 2005/0063052 | A1 | | 3/2005 | Yamaguchi | |
| 2005/0111094 | A1 | | 5/2005 | Bonaventura et al. | |

(Continued)

FOREIGN PATENT DOCUMENTS

| DE | 122481 | 7/1901 |
| DE | 30 25 974 A1 | 1/1982 |

(Continued)

*Primary Examiner* — Arnel C Lavarias
(74) *Attorney, Agent, or Firm* — Patterson Thuente Pedersen, P.A.

(57) ABSTRACT

An X-Y stage for microscopes including a base stage element, an intermediate stage element, and an upper stage element. The upper stage element is mounted to the intermediate stage element and is displaceable along a first axis. The intermediate stage element is mounted to the base stage plate and is displaceable along a second axis. A mechanical stage drive includes an upper stage element drive with an output link coupled to the upper stage element and providing a first drive direction. An intermediate stage drive with an output link is coupled to the intermediate stage and provides a second drive direction. The X-Y stage further includes at least one of a first mechanical switch for reversing the first displacement direction and a mechanical second mechanical switch for reversing the second displacement direction.

22 Claims, 5 Drawing Sheets

(56) References Cited

U.S. PATENT DOCUMENTS

| | | |
|---|---|---|
| 2005/0128575 A1 | 6/2005 | Bonaventura et al. |
| 2005/0225852 A1* | 10/2005 | Rondeau et al. .............. 359/393 |
| 2006/0187543 A1 | 8/2006 | Takeuchi |
| 2009/0219613 A1* | 9/2009 | Enge ............................ 359/384 |
| 2014/0268114 A1* | 9/2014 | Zhou et al. ................... 356/73.1 |

FOREIGN PATENT DOCUMENTS

| | | |
|---|---|---|
| DE | 35 21 047 C1 | 9/1986 |
| DE | 195 32 008 A1 | 3/1997 |
| DE | 197 35 492 A1 | 2/1999 |
| DE | 10 2004 053 437 A1 | 6/2005 |

* cited by examiner

X-Y STAGE FOR MICROSCOPES HAVING A DIRECTION CHANGING COUPLING

PRIORITY CLAIM

The present application is a National Phase entry of PCT Application No. PCT/EP2011/060029, filed Jun. 16, 2011, which claims priority from German Application Number 102010026030.4, filed Jul. 3, 2010, the disclosures of which are hereby incorporated by reference herein in their entirety.

BACKGROUND OF THE INVENTION

X-Y stages are used in professional microscopy because they permit a specimen slide fixed on it to be displaced with high precision and because the displacement in the two coordinates X and Y that define the stage plane can be controlled independently of each other. As a rule, such an X-Y stage comprises a stage plate consisting of three parts, viz. a base stage plate, an intermediate stage plate and an upper stage element. The upper stage element is mounted in a first guideway in the intermediate stage plate so as to be displaceable along a first axis X. The intermediate stage plate, in turn, is mounted in a second guideway in the base stage plate so as to be displaceable along a second axis Y. The two axes X and Y include an angle that differs from 0° and, as a rule, is 90°. Such an X-Y stage further comprises a mechanical, i.e. non-motorized stage drive, which essentially comprises two components: Firstly, the stage drive comprises an upper stage element drive with an upper stage element output link coupled to it for displacing the upper stage element. Secondly, the stage drive comprises an intermediate stage plate drive and an intermediate stage plate output link coupled to it. Using the upper stage element drive, one can define a first drive direction, and, using the intermediate stage plate drive, one can define a second drive direction. If, as commonly used, the stage drive is a coaxial control driving a shaft, the drive direction is the sense of rotation of the shaft, which, in a cross-sectional view, is either clockwise or counterclockwise.

Furthermore, such an X-Y stage may comprise first coupling means for coupling the upper stage element output link to the upper stage element. By means of the first coupling means, the upper stage element can then be displaced along the first axis in a first displacement direction, namely, as a function of the first drive direction. The drive direction, or the sense of rotation of the drive or shaft, thus defines the direction in which the upper stage element is displaced along the x-axis. Correspondingly, the X-Y stage may also comprise second coupling means for coupling the intermediate stage plate output link to the intermediate stage plate, by means of which coupling means the intermediate stage plate can be displaced along the axis Y in a second displacement direction as a function of the second drive direction.

The upper stage element may be designed in accordance with commonly used versions. In one configuration it may be designed as an upper stage plate, so that the X-Y stage altogether is composed of three stage plates located in different planes. The upper stage plate may be guided in a guideway on two sides.

In another common version, the upper stage element is designed as an upper stage strip. This can be combined with an object guide, which may be designed to be interchangeable. The upper stage strip is guided in a guideway permanently fixed to the intermediate stage plate, and the movement along the x-axis is effected by means of the driven upper stage strip along the guideway. The object guide itself is provided with means for receiving and holding a specimen slide with a specimen to be examined. This design is simpler that that incorporating an upper stage plate, because, instead of an upper stage plate held in two guideways, only an upper stage strip is required in which an object guide can be guided.

The base, intermediate and upper stage plates can be made available in different configurations. For examining specimens by transmitted light, one uses stage plates with apertures through which light coming from one side can pass through the specimen, and the light coming from the specimen, e.g., transmitted, dispersed or diffracted by it, is observed or detected on the other side. For the examination of a specimen by reflected light and the observation or detection of the light, e.g., reflected or, after excitation, emitted by the specimen, such apertures are not required, because the illuminating and observation ray paths are on the same side of the specimen. In this case the stage plates can be made without such apertures; alternatively, the apertures may be designed to be occludable, so that the stage plates are suitable for both ways of microscopical examination. For reflected-light work, it is sufficient if only one of the stage plates is occluded or without an aperture.

Microscopy is used in a variety of fields, which essentially belong to two categories, viz. biomedical applications and such in which aspects of material science are of prime importance. These two categories of applications differ by the preferred image orientations delivered by the microscope tubes employed. Tubes commonly used in biomedical applications provide an inverted image, which shows the specimen reversed both laterally (left and right sides changed) and vertically (top and bottom sides changed). Tubes used in material science show the specimens upright and true to side. Especially with higher microscope magnification, the field of view shows only a small segment of a specimen, so that the specimens need to be moved across the field of view by means of X-Y stages.

With some routine, the familiar image attitude provided by the tube, i.e., either the attitude used in biomedical applications or the one used in materials science, will enable the user to habitually manipulate the stage movement in such a way that the microscopical image of the specimen moves relatively to the field of view in the expected direction. If, however, a user, contrary to their habitual procedure, fits a tube with the image rotated by 180°, he or she will have to readapt to the stage movements required, a nuisance that will impede and slow down the microscopy jobs.

Since microscope tubes—especially such with practical and ergonomic functions appreciated by users, as, e.g., adjustable viewing heights or viewing angles—are designed according to sophisticated optical and structural concepts, they cannot be readily converted to offer both image orientations. Therefore, if a tube with a particular image orientation is preferred, e.g., for ergonomic reasons, either the user in the biomedical field or the user in materials science will face the problem of counterintuitive specimen shifting with the stage.

SUMMARY OF THE INVENTION

Therefore, embodiments of the invention allow the user to adapt the displacement of a specimen fixed on the X-Y stage by means of a specimen slide to the tube employed in such a way that the habitual movement patterns, in particular, the rotation of the coaxial stage controls, can be maintained, no matter whether the tube provides upright and true-to-side or inverted image orientation.

In an X-Y stage of the kind described above, a solution to this problem provides mechanical first switching means for reversing the first displacement direction with constant first drive direction, and/or mechanical second switching means for reversing the second displacement direction with constant second drive direction are provided. That is, the X-Y stage additionally features the said switching means, which are arranged between the respective output link and the related stage plate. A user changing the tube only needs to actuate the switching means to reverse the displacement direction as desired. Like the stage drive, the first and second switching means may be of the mechanical type, i.e. actuated manually rather than motor-driven.

The first and second switching means may form part of the coupling means, or of the respective output link, or of both.

In an embodiment of the invention, the upper stage element output link and the intermediate stage plate output link each comprise a gear wheel. This gear wheel is then fixed, e.g., on the shaft of the coaxial stage control. The first coupling means then comprise two gear racks that engage with the gear wheel. By means of the first switching means, then, either the one or the other of the two gear racks can be engaged with the one gear wheel. Accordingly, the second coupling means also comprise two gear racks to engage with the other gear wheel, and by means of the second switching means, either the one or the other of the two gear racks can be engaged with the gear wheel. Alternatively and equivalently, instead of gear wheel/rack systems one can use systems with friction wheels running on appropriate friction surfaces.

The gear wheel is arranged between the two gear racks, so that, with constant sense of rotation of the gear wheel, the gear racks are displaced in opposite displacement directions. The gear racks are coupled to the upper stage element or the intermediate stage plate; depending on which of the two gear racks engages with the gear wheel, either the intermediate stage plate or the upper stage element in the one or in the other, i.e. opposite, direction.

One embodiment to implement switching between the two gear racks is to arrange the two second gear racks—i.e. that for the upper stage element and that for the intermediate stage plate—opposite each other on a support in the form of a slide running in a slide guide. The switching means comprise one or several levers, by means of which the slide can be displaced in the slide guide, so that either the one or the other gear rack is made to engage with the gear wheel. The lever may be actuated manually, but it is just as well possible to design the switching means in such way that the lever is shifted automatically to match the tube selected. The lever or the levers should be designed to be prevented from inadvertent resetting, which can be brought about, e.g., by suitable spring elements. Instead of gear wheels it is also possible to use friction wheels and corresponding friction surfaces, as mentioned above.

Another embodiment to implement the switching means is to arrange the respective two gear racks, in mutually opposite positions, on a support that can be swivelled about a fulcrum, so that the gear wheel is positioned between the two gear racks, with the switching means comprising one or several levers by means of which the support is swivelled. Such a support with two gear racks and a suitable lever system can be used for both the upper stage element and for the intermediate stage plate. The various embodiments can be readily combined with each other.

As an alternative to using one gear wheel and two gear racks between which the gear wheel is positioned, one can use two gear wheels and one gear rack. For this purpose, the upper stage element output link and the intermediate stage plate output link are each provided with an output gear wheel arranged on an output axis of the upper stage element output link or of the intermediate stage plate output link, respectively. The first and second coupling means each comprise one gear rack to engage with the respective output gear wheel. The first and second switching means, then, each comprise an intermediate gear that is arranged on an axis parallel to the respective output axis and can be engaged between the output gear wheel and the gear rack for reversing the displacement direction. If the output gear wheel engages with the gear rack directly, the latter, or the stage plate attached to it, will move in the displacement direction as defined by the drive direction of the output link gear wheel. If an intermediate gear is made to engage between gear rack and output gear wheel, the latter will reverse the direction of motion of the gear rack, with the drive direction of the output link gear wheel remaining the same. The intermediate gear can be inserted between output gear wheel and gear rack by means of a suitable lever system.

Instead of a system of gear racks and gear wheels, or friction surfaces and friction wheels, one can use designs based on rope drives. In such an embodiment, the first and the second coupling means each comprise two output rope pulleys arranged on, and freely rotatable about, an output axis of the upper stage element output link, and of the intermediate stage plate output link, respectively. The upper stage element output link and the intermediate stage plate output link are each provided with a clutch on the respective output axis, for selective clutching to exactly one of the two output rope pulleys. By means of the clutch, the drive direction, or the sense of rotation of the output axis is transmitted either to one or the other output rope pulley. Such mechanisms have to be provided for both movable stage plates. In either case, each of the two output pulleys on the respective output axis is linked, via a rope loop, to a rope pulley, which is part of a displacement mechanism for displacing the upper stage element or the intermediate stage plate, respectively. One of the two rope loops is arranged straight, whereas the other is arranged in a crossed manner. In this way, rotation can be transmitted via one of the two output rope pulleys in the opposite sense, and via the other of the two output rope pulleys in the same sense. By actuating the clutch, then, the first or the second displacement direction, respectively, can be reversed.

As an alternative to the arrangements described herebefore, in which the drive direction does not change, other designs are feasible in which, via a suitable embodiment of the coupling between drive and output link, for both the upper stage element and the intermediate stage plate, a reversal of the drive direction can be set if the coupling is provided, e.g., with a reverse gear as in transmission gears, which can be achieved, e.g., in a gear-tooth clutch, by incorporating an extra gear wheel. Such a clutch can be controlled manually (mechanically, by an electric motor or electronically), or automatically depending on the tube chosen.

It is understood that the features mentioned before and those to be explained below are applicable not only in the combinations stated but also in other combinations or as stand-alone features without leaving the scope of the present invention. The various mechanisms can readily be combined, so that, for example, the switching and/or coupling means used for the upper stage element differ from those used for the intermediate stage plate. Obviously, it is also possible and within the scope of the invention, to provide either only the intermediate stage plate or only the upper stage element with switching means.

BRIEF DESCRIPTION OF THE DRAWINGS

Below, the invention will be explained in more detail by examples and with reference to the accompanying drawings, which also show features essential to the invention, and in which.

DETAILED DESCRIPTION OF THE DRAWINGS

Figure 1:
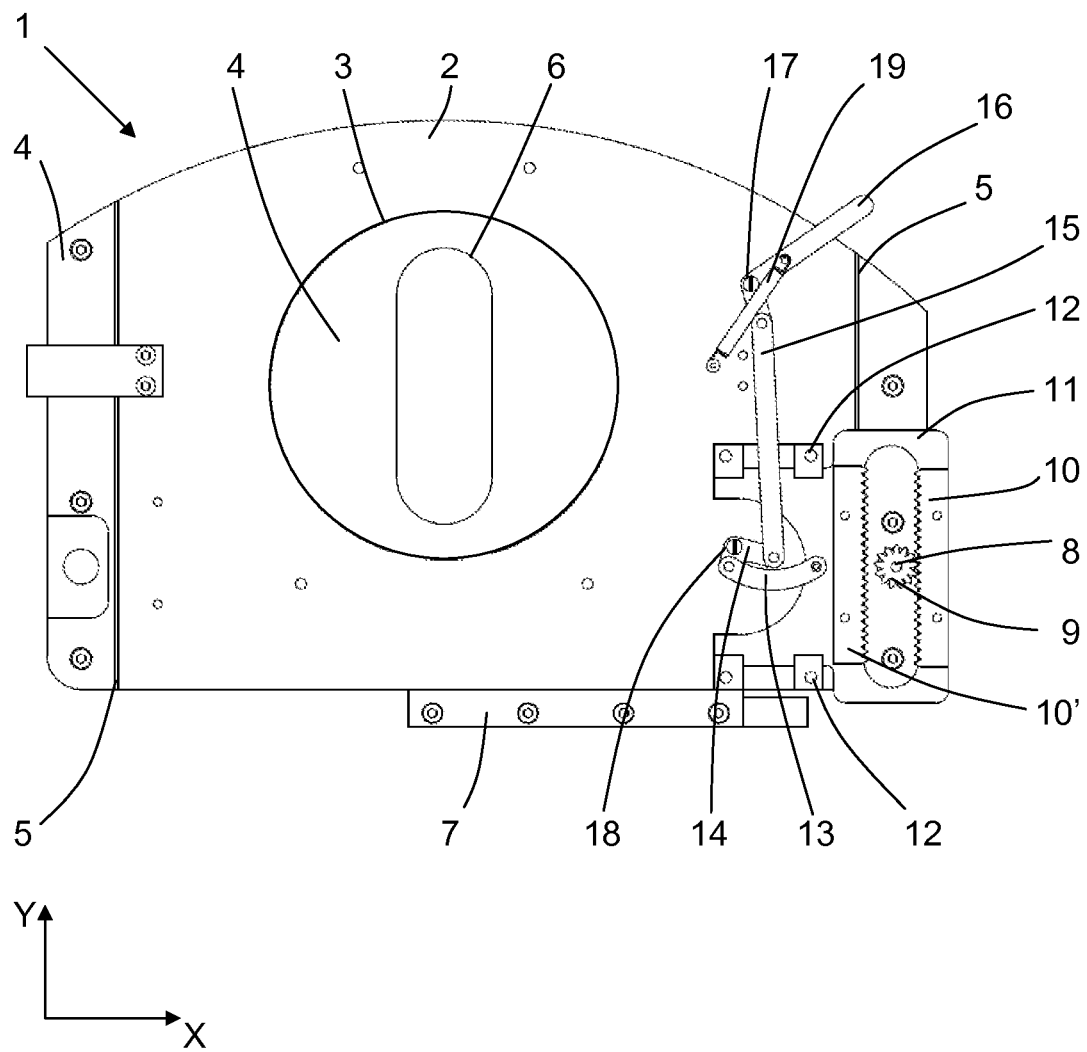
FIG. 1 shows an X-Y stage with a first embodiment of switching means.

FIG. 1 shows a typical X-Y stage 1 for microscopes as seen from below. The X-Y stage 1 comprises a base stage plate 2 with a large aperture 3. The base stage plate 2 is provided with a second guideway 5, in which an intermediate stage plate 4 is displaceable along a second axis Y. In the viewing direction, the intermediate stage plate 4 is behind the base stage plate 2. The intermediate stage plate 4 is provided with an aperture 6. Arranged above the aperture 6, as a rule, is the specimen (not shown here) on a specimen slide; the apertures admit light for illuminating or manipulating the specimen. The specimen slide may, for example, be held in an object guide that is connected with an upper stage element 7, if this is designed as an upper stage strip as in the embodiment shown here. The upper stage strip itself is mounted displaceably in a first guideway (not shown) in the intermediate stage plate 4 along a first axis X. Instead of an upper stage strip one may also use an upper stage plate, onto which the specimen slide can then be fixed directly. The first axis X and the second axis Y include an angle that differs from zero and commonly equals 90°. The X-Y stage 1 further comprises a mechanical stage drive (not shown completely), which comprises both a control for the upper stage strip and a control for the intermediate stage plate 4. The control for the upper stage strip comprises an upper stage element drive and an upper stage element output link coupled with it. The control for the intermediate stage plate 4 comprises an intermediate stage plate drive and an intermediate stage plate output link coupled with it; in this example, the intermediate stage plate output link is designed as a shaft with an output axis 8. The stage element output link (not shown) is designed accordingly.

The upper stage element drive defines a first drive direction, and the intermediate stage plate drive defines a second drive direction. In the case shown, the drive direction corresponds to the sense of rotation of the shaft about the output axis 8.

Also provided are first coupling means for coupling the upper stage element output link with the upper stage strip, by means of which the upper stage strip is displaceable in a first displacement direction along the first axis X as a function of the first drive direction. Second coupling means are provided for coupling the intermediate stage plate output link with the intermediate stage plate 4, by means of which the intermediate stage plate 4 is displaceable in a second displacement direction along the second axis Y as a function of the second drive direction.

The X-Y stage 1 is further provided with mechanical first switching means for reversing the first displacement direction while the first drive direction remains constant, and mechanical second switching means for reversing the second displacement direction while the second drive direction remains constant. The switching means are of mechanical design, i.e. to be actuated manually rather than motor-driven. By using of these switching means, a user can retain familiar movement routines, even when changing between tubes of differing imaging systems, i.e. such with "erect" image orientation and such with "inverted" image orientation. The user only needs to be sure to actuate the switching means according, so that the displacement direction is reversed, unless this is effected automatically by changing the tube.

In the embodiment shown in FIG. 1, are the first switching means form part of the first coupling means, and the second switching means form part of the second coupling means. The illustration only shows the second coupling and switching means, which are required for the displacement of the intermediate stage plate 4. Here, a gear wheel 9 is fixed on the output axis 8 of the intermediate stage plate output link; this gear wheel 9 rotates in accordance with the second drive direction. A corresponding gear wheel is also provided on the upper stage element output link. The second coupling means comprise two gear racks 10 and 10' to engage with the gear wheel 9. The first coupling means are provided with corresponding gear racks. The two gear racks are arranged opposite each other on a slide 11 and have the gear wheel 9 between them. The slide 11 is displaceably mounted in a slide guide 12.

The switching means comprise a system of levers 13, 14, 15 and 16, by means of which the slide 11 can be moved between its limit positions, in such a way that, during switching, the lever 16 pivots about a fulcrum 17, and lever 14, pivoting about another fulcrum 18, displaces lever 13. A spring element 19 ensures that the limit positions after the reversal of the displacement direction by means of lever 16 are reliably retained. In either end position, only one of the two gear racks 10 or 10' is engaged with gear wheel 9 at a time. Because of the opposed arrangement of the gear racks 10 and 10', the movement of the intermediate stage plate 4, after the switching of lever 16, takes place in the opposite direction every time, without any change of the second drive direction. A corresponding mechanism is also provided for the upper stage strip 7.

Figure 2:
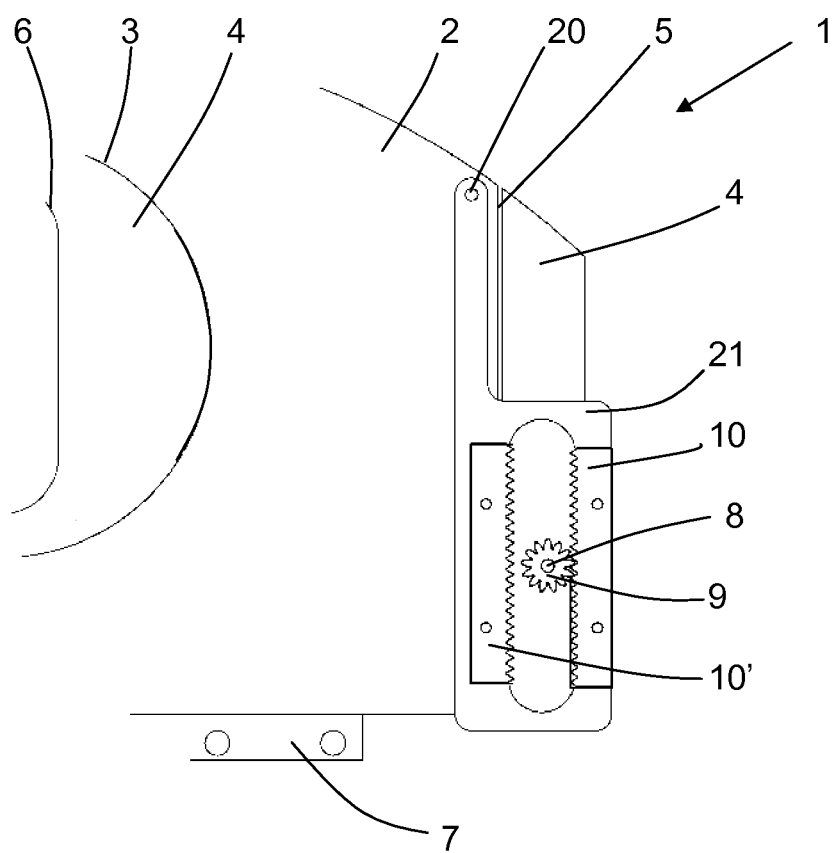
FIG. 2 shows an X-Y stage with a second embodiment of switching means.

FIG. 2 shows a slightly different embodiment of the second coupling and switching means. Here, the two gear racks 10, 10' are arranged opposite each other on a support 21 that can be pivoted about a fulcrum 20. Analogously to FIG. 1, though not shown in detail here, the switching means again may comprise one or several levers, by means of which the support 21 can be pivoted. Further, a spring element may be provided again, with which the support 21 is held in the respective limit positions, i.e. the positions in which either gear rack 10 or the other gear rack 10' is engaged with gear wheel 9. Correspondingly, similar means are provided with regard to the upper stage element output link and the displacement of the upper stage strip. Here again, actuation of the respective levers effects a reversal of the first displacement direction while the first drive direction remains constant.

It is also feasible to have a combination of the two embodiments in FIGS. 1 and 2 in such a way that, for example, a mechanism as shown in FIG. 1 is provided for displacing the upper stage element 7, and a mechanism as shown in FIG. 2 is provided for displacing the intermediate stage plate.

Figure 3:
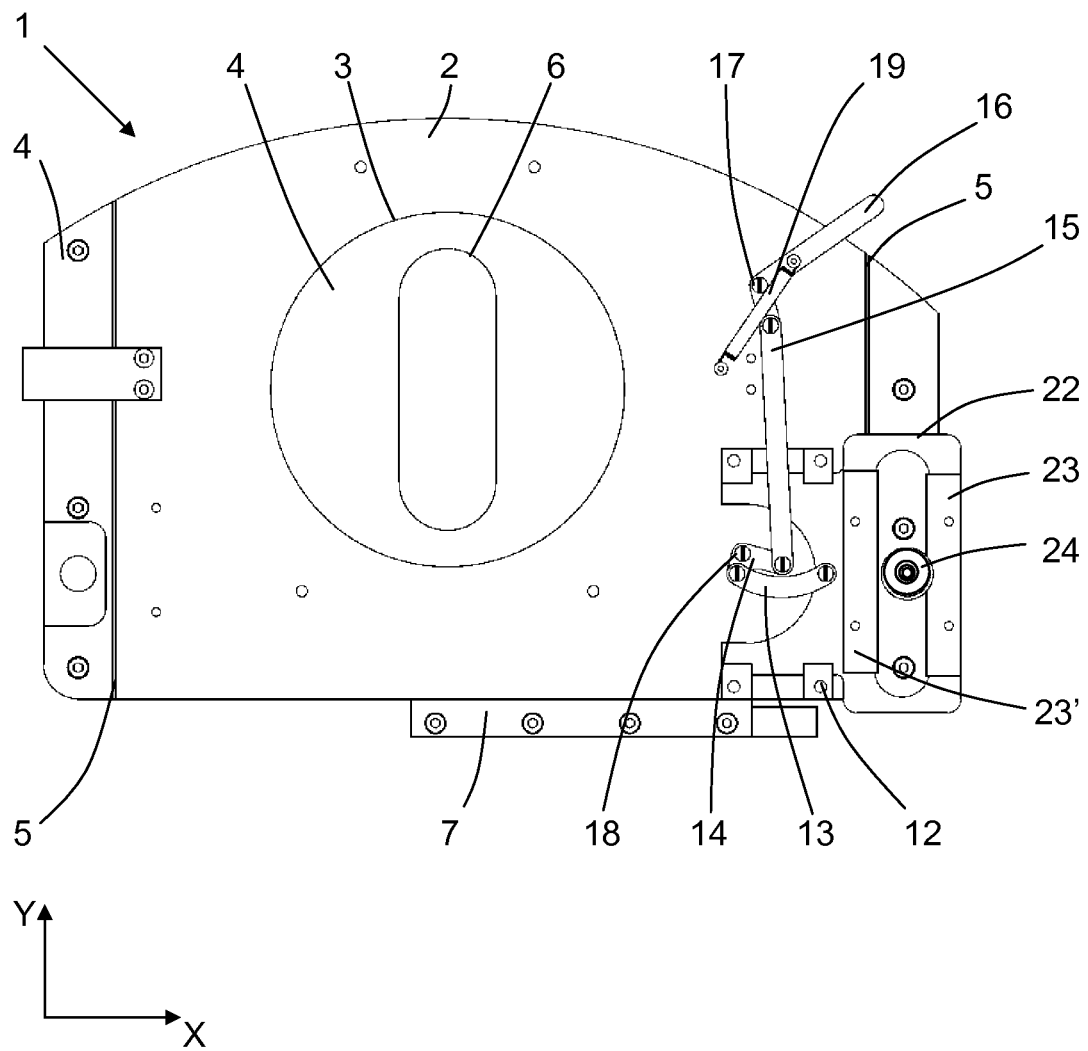
FIG. 3 shows an X-Y stage with a third embodiment of switching means.
Figure 4:
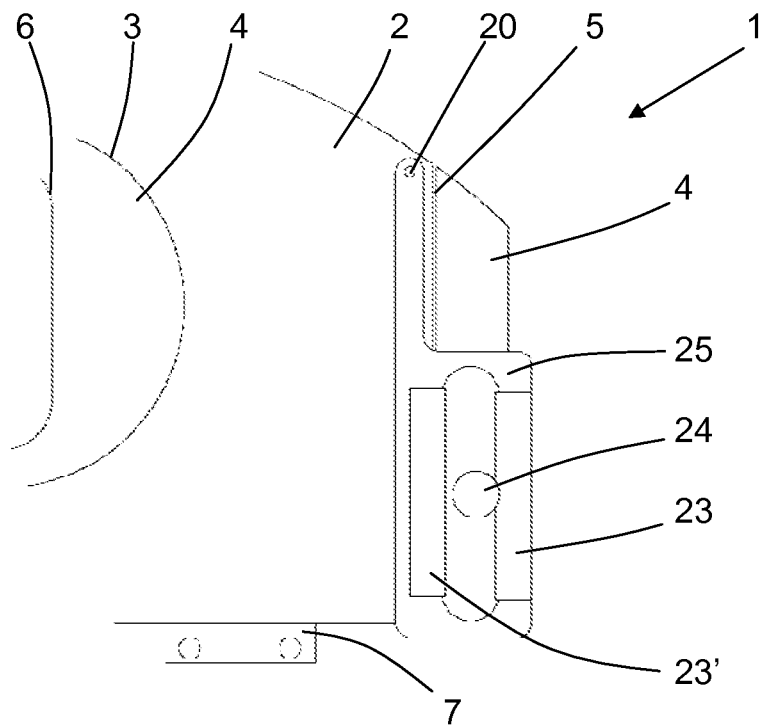
FIG. 4 shows an X-Y stage with a fourth embodiment of switching means.

Instead of gear wheels and gear racks, one can also use friction wheels and corresponding friction surfaces, provided that an appropriate contact pressure can be produced by the lever system and the spring element. Such equivalent Mechanisms are shown in FIG. 3 and FIG. 4. In FIG. 3, a slide 22 is used, which has friction surfaces 23 and 23' instead of gear racks. A friction wheel 24 is used instead of a gear wheel. In the arrangement shown in FIG. 3, the friction surfaces 23 and 23' are so designed that their normals lie in the sheet plane, and the friction wheel 24 rolls along one or the other of the surfaces. Above and below, the friction wheel 24 itself is provided with a protective element, which is intended to guide the friction wheel 24 along the friction surfaces 23, 23', which is why the friction wheel 24 seen in FIG. 3 slightly juts out over the part that incorporates the friction surface.

The design of the lever systems may essentially be identical to those for the gear version, but compared to the latter it may be necessary to exert a greater pressure on the friction surfaces to avoid slipping of the friction wheel; the various components involved have to be adapted accordingly.

FIG. 4 shows an arrangement with friction surfaces 23, 23' arranged on a pivoted support 25, corresponding to the X-Y stage 1 with pivoted gear racks shown in FIG. 2.

A combination of the various embodiments is readily possible; one can use, for example, gear racks and gear wheel in connection with the intermediate stage output link, but friction surfaces and friction wheel in connection with the upper stage element output link, or vice versa. The use of slides and pivoted supports is likewise within the scope of variations common in the art.

Figure 5:
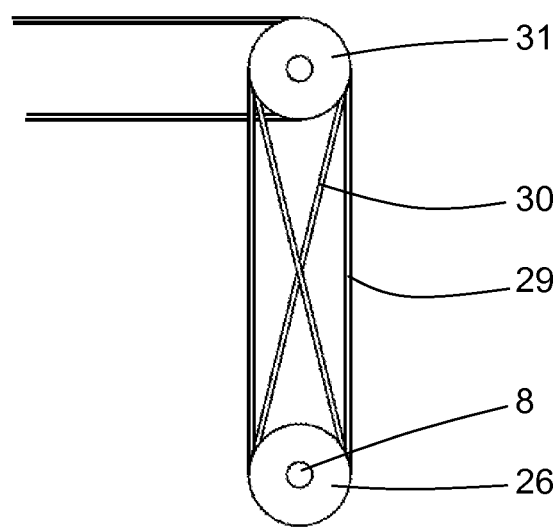
FIG. 5 shows an alternative embodiment for reversing the displacement direction.
Figure 6:
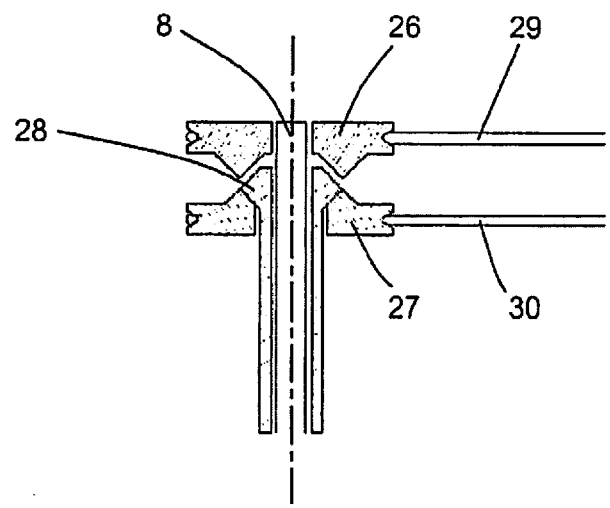
FIG. 6 shows a detail of the embodiment shown in FIG. 5.

FIGS. 5 and 6 show an alternative embodiment of the coupling and switching means, which is not based on gear wheels and gear racks but on the use of rope drives. In this embodiment, the first and second coupling means each are provided with two output rope pulleys 26, 27 arranged on, and freely rotatable about, an output axis 8 of the upper stage element output link, and of the intermediate stage plate output link, respectively. FIGS. 5 and 6 each show a detail only of the coupling and switching means, which can be used both for displacing the upper stage element 7 and for displacing the intermediate stage plate. The output rope pulleys 26 and 27 are freely rotatable about the output axis 8, i.e. they can be rotated fundamentally independent of the respective first or second drive direction.

Further, the respective output axes 8 of the upper stage element output link and the intermediate stage plate output link are each provided with a clutch 28 for selectively clutching exactly one of the two output rope pulleys 26 or 27. Thus, by shifting the clutch 28 on the output axis 8, either the output rope pulley 26 or the output rope pulley 27 is clutched to the respective output link and made to rotate about the output axis 8 corresponding to the respective drive direction. In the situation shown in FIG. 6, the output rope pulley 27 is clutched, via clutch 28, either to the intermediate stage plate output link or the upper stage element output link.

Each of the two output rope pulleys 26, 27 is connected to the respective output axis 8 via a rope loop 29, 30 with a rope pulley 31, which is part of a displacement mechanism for displacing the upper stage strip or an upper stage plate, or part of the displacement mechanism for displacing the intermediate stage plate 4. In either of the two displacement mechanisms, then, both loops 29 and 30 are, one at a time, connected with the same rope pulley 31. Alternatively, and with equivalent effect, two coupled rope pulleys 31 can be used per displacement mechanism, although this increases the complexity of the mechanism. In this case, the one of the two rope loops, i.e. rope loop 29, has a parallel arrangement, whereas the other, rope loop 30, has a crossed arrangement. Via the output axis 8, either output pulley 26 or output pulley 27 is made to rotate, with the rotation of the two output rope pulleys 26, 27 being the same for a constant first or second drive direction. Due to the differing arrangements of the rope loops 29, 30, however, rotation in the same direction is transmissible to rope pulley 31 via one of the two output pulleys, i.e. 26, whereas rotation in the opposite direction is transmissible to rope pulley 31 via the other output pulley, 27. Actuation of the clutch 28, designed as a sleeve, will then reverse the respective displacement direction, i.e. either the first displacement direction in case of the upper stage element 7 or the second displacement direction in case of the intermediate stage plate 4.

The crossing point of rope drive 30 merely exists on the drawing. Actually, the two rope lengths must be kept at some mechanical spacing in such a way that the crossed rope drive 30 does not move in a plane normal to the output axis 8 and the axis of rotation of the rope pulley 31. To displace the upper stage element 7 or the intermediate stage plate 4, the rope drives and pulleys may also be coupled with gear wheels, which then again engage with gear racks to implement the displacement. Thus, a combination of the various embodiments described above is possible.

Figure 7:
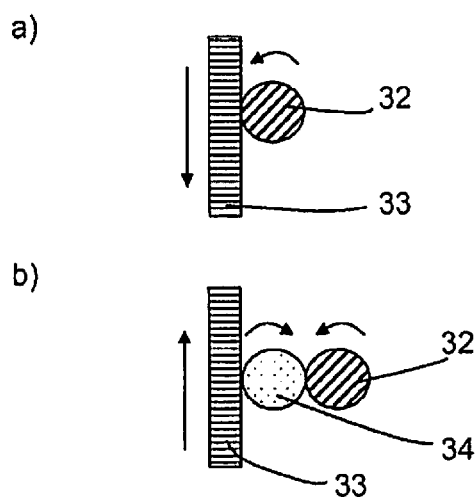
FIG. 7 illustrates the principle of a switching mechanism based on the use of two gear or friction wheels.

Another alternative embodiment is shown schematically in FIG. 7. Again, the mechanism illustrated can be used for displacing the upper stage element 7 as well as the intermediate stage plate 4. The upper stage element output link and the intermediate stage plate output link are each provided with an output gear wheel 32 arranged on an output axis 8 of the upper stage element output link or of the intermediate stage plate output link, respectively. The first and second coupling means each comprise a gear rack 33 to be engaged with the respective output gear wheel 32. The sense of rotation of the output link gear wheel 32, which corresponds to the drive direction, and the displacement direction of the gear rack 33 are indicated by arrows. FIG. 7a shows the output gear wheel 32 directly engaged with the gear rack 33. The gear rack 33 is displaced downward. For reversing the displacement direction of the gear rack 33, the first and second switching means each comprise an intermediate gear 34 arranged on an axis parallel to the respective output axis 8, which can be interposed between the output gear wheel 32 and the gear rack 33 for reversing the respective displacement direction. This is shown in FIG. 7b: Here, the intermediate gear 34 is interposed between gear rack 33 and output gear wheel 32; it runs in a sense opposite to that of the output gear wheel 32, and consequently the displacement direction of the gear rack 33 is reversed as compared to the displacement direction shown in FIG. 7a.

The X-Y stages described herein thus make it possible, by simple mechanical switching, for users who change from a tube delivering erect image orientation to a tube delivering inverted image orientation to retain their familiar motions, e.g., when turning the coaxial stage controls.

LIST OF REFERENCE NUMBERS

1 X-Y stage
2 base stage plate
3 aperture
4 intermediate stage plate
5 second guideway
6 aperture
7 upper stage element
8 output axis
9 gear wheel
10, 10' gear racks
11 slide
12 slide guide
13, 14, 15, 16 levers
17, 18 fulcrum
19 spring element
20 fulcrum 21 support
22 slide
23, 23' friction surfaces
24 friction wheel
25 support
26, 27 output rope pulleys
28 clutch
29, 30 rope loops
31 rope pulley
32 output gear wheel
33 gear rack
34 intermediate gear

What is claimed is:

1. An X-Y stage for microscopes, comprising
a base stage plate, an intermediate stage plate and an upper stage element, with the upper stage element being mounted in a first guideway in the intermediate stage plate so as to be displaceable along a first axis, and the intermediate stage plate being mounted in a second guideway in the base stage plate so as to be displaceable along a second axis, which with the first axis includes an angle that is different from zero,
an upper stage element drive and an upper stage output link coupled to it and providing a first drive direction of the upper stage element;
an intermediate stage plate drive and an intermediate stage output link coupled to it and providing a second drive direction of the intermediate stage plate,
first coupling means for coupling the upper stage element output link to the upper stage element, by operation of which the upper stage element is displaceable in a first displacement direction along the first axis as a function of the first drive direction,
second coupling means for coupling the intermediate stage plate output link to the intermediate stage plate, by operation of which the intermediate stage plate is displaceable in a second displacement direction along the second axis as a function of the second drive direction, and
at least one of a mechanical first switching means for reversing the first displacement direction with a constant first drive direction, and a mechanical second switching means for reversing the second displacement direction with a constant second drive direction.

2. The X-Y stage for microscopes of claim 1 in combination with a microscope.

3. An X-Y stage for microscopes, comprising:
a base stage element, an intermediate stage element and an upper stage element, with the upper element mounted over the intermediate stage element and displaceable with respect to the intermediate stage element along a first axis, the intermediate stage element being mounted over the base stage element and displaceable with respect thereto along a second axis;
an upper stage element drive coupled to the upper stage element and providing a first drive direction of the upper stage element;
an intermediate stage element drive coupled to the intermediate stage element and providing a second drive direction of the intermediate stage element; and
at least one of: a mechanical switch associated with the upper stage element drive for reversing the first drive direction and a mechanical switch associated with the intermediate stage element drive for reversing the second drive direction.

4. An X-Y stage as claimed in claim 3, wherein the upper stage element drive is coupled to the upper stage element by way of a gear wheel that is selectively engageable with either one of two gear racks and wherein the mechanical switch operates to selects the one of the two gear racks.

5. An X-Y stage as claimed in claim 3, wherein the intermediate stage element drive is coupled to the intermediate stage element by way of a gear wheel that is selectively engageable with either one of two gear racks and wherein the mechanical switch selects the one of the two gear racks.

6. An X-Y stage as claimed in claim 3, wherein the upper stage element drive is coupled to the upper stage element by way of a gear wheel that is selectively engageable with either one of two gear racks and wherein the mechanical switch operates to selects the one of the two gear racks, and wherein the intermediate stage element drive is coupled to the intermediate stage element by way of an additional gear wheel that is selectively engageable with either one of two additional gear racks and wherein an additional mechanical switch selects the one of the two gear racks.

7. An X-Y stage as claimed in claim 4, wherein the respective two gear racks are arranged in mutually opposite positions on a support in the form of a slide in a slide guide, and further comprising a switching means comprising at least one lever, for displacing the slide in the slide guide.

8. An X-Y stage as claimed in claim 5, wherein the respective two gear racks are arranged in mutually opposite positions on a support in the form of a slide in a slide guide, and further comprising a switching means comprising at least one lever, for displacing the slide in the slide guide.

9. An X-Y stage as claimed in claim 4, wherein the respective two gear racks are arranged in mutually opposite positions on a support pivotable on a fulcrum, and the mechanical switch comprises at least one lever, by which the support can be pivoted.

10. An X-Y stage as claimed in claim 5, wherein the respective two gear racks are arranged in mutually opposite positions on a support pivotable on a fulcrum, and the mechanical switch comprises at least one lever, by which the support can be pivoted.

11. An X-Y stage as claimed in claim 3, wherein the upper stage element drive is coupled to the upper stage element by two output rope pulleys each mounted on an output axle of the upper stage element drive, a selectively operated clutch for selecting one of the two pulleys to be driven by the upper stage element drive, each of the output rope pulleys having a rope loop connected thereto, the loops connecting to a rope pulley on a displacement mechanism for displacing the upper stage element, one of the loops being parallel and one having a crossed arrangement, whereby the selection of one of the two output rope pulleys by the clutch provides one of a rotation in one direction and a rotation in an opposite direction of the respective rope pulley and correspondingly a first displacement direction of the upper stage element and an opposite displacement direction of the upper stage element.

12. An X-Y stage as claimed in claim 3, wherein the intermediate stage element drive is coupled to the intermediate stage element by two output rope pulleys each mounted on an output axle of the intermediate stage element drive, a selectively operated clutch for selecting one of the two pulleys to be driven by the intermediate stage element drive, each of the output rope pulleys having a rope loop connected thereto, the loops connecting to a rope pulley on a displacement mechanism for displacing the intermediate stage element, one of the loops being parallel and one having a crossed arrangement, whereby the selection of one of the two output rope pulleys by the clutch provides one of a rotation in one direction and a rotation in an opposite direction of the respective rope pulley and correspondingly a first displacement direction of the intermediate stage element and an opposite displacement direction of the intermediate stage element.

13. An X-Y stage as claimed in claim 11, wherein the intermediate stage element drive is coupled to the intermediate stage element by two output rope pulleys each mounted on an output axle of the intermediate stage element drive, a selectively operated clutch for selecting one of the two pulleys to be driven by the intermediate stage element drive, each of the output rope pulleys having a rope loop connected thereto, the loops connecting to a rope pulley on a displacement mechanism for displacing the intermediate stage element, one of the loops being parallel and one having a crossed arrangement, whereby the selection of one of the two output rope pulleys by the clutch provides one of a rotation in one direction and a rotation in an opposite direction of the respective rope pulley and correspondingly a first displacement direction of the intermediate stage element and an opposite displacement direction of the intermediate stage element.

14. An X-Y stage as claimed in claim 3, wherein the upper stage element drive is provided with an output gear wheel arranged on an output axle of the upper stage element drive and a gear rack coupled to the upper stage element engages with the respective output gear wheel providing a displacement of the upper stage element in an displacement direction, and that the mechanical switch comprises an intermediate gear on an axle parallel to the respective output axle, the intermediate gear being interposable between the output gear wheel and the gear rack for reversing the respective displacement direction of the upper stage element.

15. An X-Y stage as claimed in claim 3, wherein the intermediate stage element drive is provided with an output gear wheel arranged on an output axle of the intermediate stage element drive and a gear rack coupled to the intermediate stage element engages with the respective output gear wheel providing a displacement of the intermediate stage element in an displacement direction, and that the mechanical switch comprises an intermediate gear on an axle parallel to the respective output axle, the intermediate gear being interposable between the output gear wheel and the gear rack for reversing the respective displacement direction of the intermediate stage element.

16. An X-Y stage as claimed in claim 14, wherein the intermediate stage element drive is provided with an output gear wheel arranged on an output axle of the intermediate stage element drive and a gear rack coupled to the intermediate stage element engages with the respective output gear wheel providing a displacement of the intermediate stage element in an displacement direction, and that the mechanical switch comprises an intermediate gear on an axle parallel to the respective output axle, the intermediate gear being interposable between the output gear wheel and the gear rack for reversing the respective displacement direction of the intermediate stage element.

17. An X-Y stage as claimed in claim 3, wherein the upper stage element drive comprises a friction wheel, and that the upper stage element drive is coupled to the upper stage element by way of two friction surfaces on which the friction wheel is selectively engageable with the mechanical switch operable to select one or the other of the friction surfaces to be engaged with the friction wheel, whereby engagement of one of the friction surfaces provides for displacement of the upper stage element in one direction and engagement of the other of the friction surfaces provides for engagement in an opposite direction.

18. An X-Y stage as claimed in claim 3, wherein the intermediate stage element drive comprises a friction wheel, and that the intermediate stage element drive is coupled to the intermediate stage element by way of two friction surfaces on which the friction wheel is selectively engageable with the mechanical switch operable to select one or the other of the friction surfaces to be engaged with the friction wheel, whereby engagement of one of the friction surfaces provides for displacement of the intermediate stage element in one direction and engagement of the other of the friction surfaces provides for engagement in an opposite direction.

19. An X-Y stage as claimed in claim 17, wherein the intermediate stage element drive comprises a friction wheel, and that the intermediate stage element drive is coupled to the intermediate stage element by way of two friction surfaces on which the friction wheel is selectively engageable with the mechanical switch operable to select one or the other of the friction surfaces to be engaged with the friction wheel, whereby engagement of one of the friction surfaces provides for displacement of the intermediate stage element in one direction and engagement of the other of the friction surfaces provides for engagement in an opposite direction.

20. An X-Y stage as claimed in claim 3 in combination with a microscope.

21. An X-Y stage as claimed in claim 3 wherein the intermediate stage element is configured as a plate.

22. An X-Y stage as claimed in claim 16, wherein the upper stage element is designed as a plate and the intermediate stage element is configured as a plate.

* * * * *